United States Patent [19]

Kato

[11] Patent Number: 4,947,702
[45] Date of Patent: Aug. 14, 1990

[54] INDUSTRIAL ROBOT
[75] Inventor: Hisao Kato, Inazawa, Japan
[73] Assignee: Mitsubishi Denki Kabushiki Kaisha, Japan
[21] Appl. No.: 353,609
[22] Filed: May 18, 1989
[30] Foreign Application Priority Data Jun. 14, 1988 [JP] Japan .................. 63-146270

[51] Int. Cl.⁵ .................. B25J 18/00; F16H 25/20
[52] U.S. Cl. .................. 74/479; 74/89.15; 901/17; 901/21; 901/23
[58] Field of Search .................. 74/89.15, 479; 901/17, 901/21, 23

[56] References Cited

U.S. PATENT DOCUMENTS

| 4,502,830 | 3/1985 | Inaba et al. | 901/17 X |
| 4,557,662 | 12/1985 | Terauchi et al. | 901/21 X |
| 4,566,847 | 1/1986 | Maeda et al. | 901/17 X |
| 4,738,015 | 4/1988 | Kato | 29/407 |
| 4,813,846 | 3/1989 | Helms | 901/23 X |
| 4,829,840 | 5/1989 | Torii et al. | 901/21 X |

FOREIGN PATENT DOCUMENTS

| 58-211889 | 12/1983 | Japan . |
| 62-40155 | 8/1987 | Japan . |
| 62-181841 | 8/1987 | Japan . |
| 62-181888 | 8/1987 | Japan . |

Primary Examiner—Allan D. Herrmann
Attorney, Agent, or Firm—Leydig, Voit & Mayer

[57] ABSTRACT

An industrial robot includes a base body, a hand, first and second horizontal arms rotatably coupled to each other, and a lift shaft provided between the base body and the first horizontal arm. The robot also includes drivers provided on the base body for driving the first and second horizontal arms and the hand, respectively, and transmission mechanisms provided in the base body and the first and second horizontal arms for transmitting the output power of the drivers to each of the first and second horizontal arms and the hand.

5 Claims, 3 Drawing Sheets

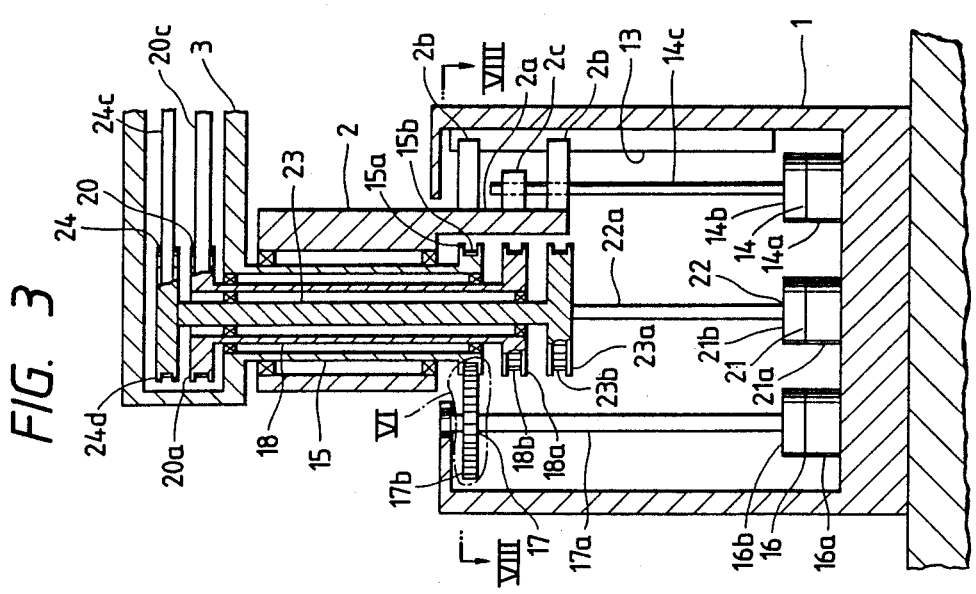

INDUSTRIAL ROBOT

BACKGROUND OF THE INVENTION

1. Field of the Invention

This invention relates to a horizontally articulated robot, and more particularly to increase of the speed of operation of its horizontal arm and to improvement of the reliability in operation of the same.

2. Prior Art

FIG. 1 shows a conventional industrial robot similar to an industrial robot which has been disclosed by Japanese Patent Application (OPI) No. 211889/1983 (the term "OPI" as used herein means an "unexamined published application"). In FIG. 1, reference numeral 1 designates a base body; 2, a lift shaft provided in the base body 1; 3, a horizontal arm provided on the side of the base body one end portion of which is pivotally mounted on the upper end portion of the base body 1 (hereinafter referred to as "a first horizontal arm 3" when applicable); 4, a first drive unit including an electric motor and a speed reducer, the drive unit being mount on the upper end of the lift shaft 2 to turn the first horizontal arm 3; 5, a horizontal arm provided on the side of work (hereinafter referred to as "a second horizontal arm 5" when applicable), the horizontal arm being pivotally coupled to the outer turning end of the first horizontal arm 3; 6, second drive unit including an electric motor and a speed reducer, the drive unit being provided at the outer turning end of the first horizontal arm 3 to turn the second horizontal arm; 7, an operating hand pivotally coupled to the outer turning end of the second horizontal arm 5; 8, a third drive unit including an electric motor and a speed reducer, the third drive unit being provided at the outer turning end of the second horizontal arm 5 to turn the operating handle 7; 9, a cable inserted into the base body 1 with its one end connected to the first drive unit 4 provided for the first horizontal arm 3; 10, a cable inserted into the base body 1 with its one end connected to the second drive unit 6 provided for the second horizontal arm 5; 11, a cable inserted into the base body 1 with its one end connected to the third drive unit 8 provided for the operating hand 7; and 12, a holder supporting the cables 10 and 11 at the middle.

The conventional industrial robot is constructed as described above. Its hand 7 is positioned by operating the robot as follows: The lift shaft 2 is operated to set the first horizontal arm 3 at a desired level. The first drive unit 4 is energized through the cable 9 to turn the first horizontal arm 3 to be set at a desired position. The second drive unit 6 is energized through the cable 10, to swing the second horizontal arm 5 to be set at a desired position. Similarly, the third drive unit 8 is energized through the cable 11, to turn the hand 7 to cause the latter 7 to take a predetermined posture. With the hand 7 thus positioned, a predetermined operation is carried out. Thereafter, the drive units 4, 6 and 8 are energized again, to perform the next operation.

In the above-described industrial robot, the heavy drive units 4, 6 and 8 are provided at the ends of the first and second horizontal arms 3 and 5, and are energized through the cables 9, 10 and 11. In order to operate the first and second horizontal arms 3 and 5 at high speed or at high acceleration or deceleration speed, it is necessary to increase the output power of the drive units 4, 6 and 8. However, to do so is to increase the weight of the drive unit. Therefore, it is rather difficult for the conventional industrial robot to increase the speed of the horizontal arms. Furthermore, because the robot is operated through the cables 9, 10 and 11, it is essential to prevent the occurrence of troubles due to the breakage or disconnection of the cables.

SUMMARY OF THE INVENTION

An object of this invention is to solve the above-described problems. More specifically, an object of the invention is to provided an industrial robot which can be operated at higher speed and is free from difficulties attributing to the cables connected thereto.

In an industrial robot according to the invention, drive units such as for instance a drive unit for a hand are mounted on the base body thereof, and their operations are transmitted to horizontal arms etc. through respective transmission mechanisms.

In the industrial robot according to the invention, no drive units are provided on the horizontal arms, and therefore the operating sections can be reduced in weight as much. Furthermore, the drive units are mounted on the base body, and the cables can be secured to the stationary section of the robot, thus being prevented from vibration.

BRIEF DESCRIPTION OF THE DRAWINGS

FIG. 3 is an enlarged vertical sectional view showing part III of FIG. 2.

FIG. 4 is an enlarged vertical sectional view showing part IV of FIG. 2.

FIG. 5 is an enlarge vertical sectional view showing part V of FIG. 2.

DETAILED DESCRIPTION OF THE PREFERRED EMBODIMENTS

Figure 1:
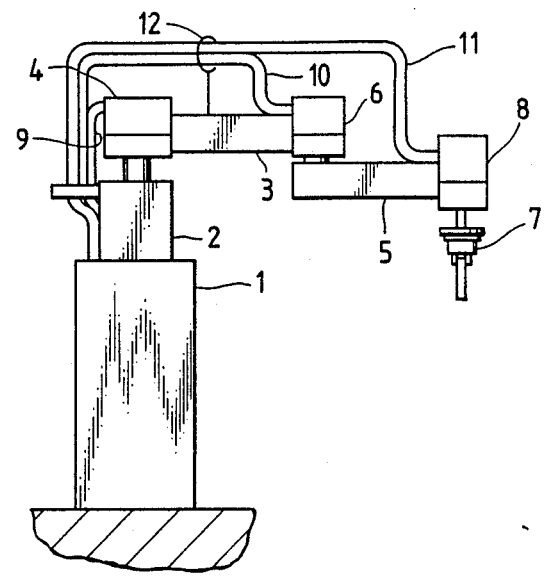
FIG. 1 is a front view showing a conventional industrial robot.
Figure 2:
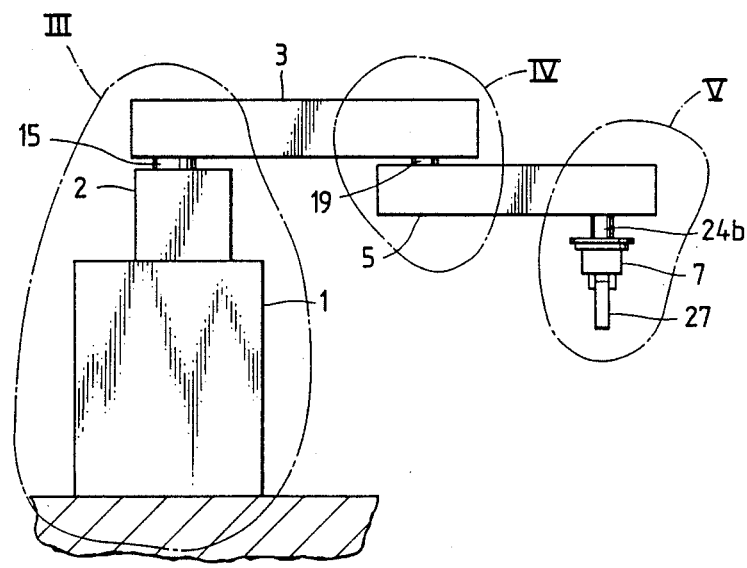
FIG. 2 is a front view showing one example of an industrial robot a to this invention.
Figure 8:
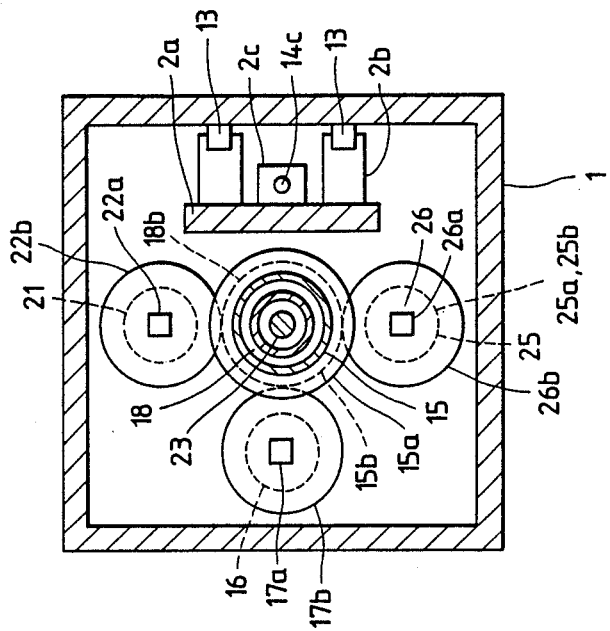
FIG. 8 is a sectional view taken along VIII-VIII of FIG. 3.
Figure 6:
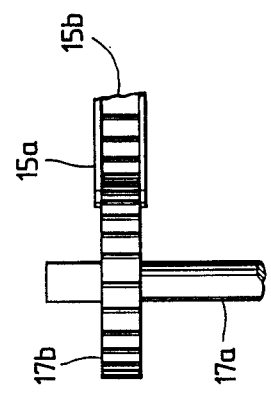
FIG. 6 is an enlarged side view showing part VI of FIG. 3.
Figure 7:
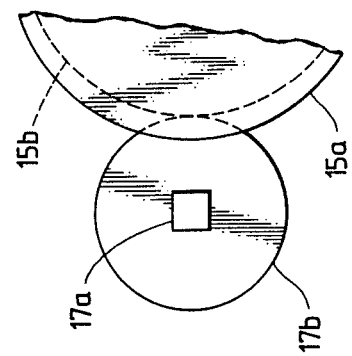
FIG. 7 is a plan view showing part VI of FIG. 3.

One embodiment of this invention will be described with reference to FIGS. 2 through 8, in which components functionally corresponding to those already described with reference to FIG. 1 are designated by the same reference numerals or characters.

In these figures, reference character 2a designates a leg formed by extending the lower end of the cylindrical lift shaft 2 downwardly; 2b, a guide protruded from the leg 2a; 2c, a nut engaged with a ball screw 14c described later; 13, a rail installed vertically in the base body 1 to movably support the guide 2b of the lift shaft 2; 14, a lift drive unit including an electric motor 14a and a speed reducer 14b, the lift drive unit being mounted on the base body 1 and having the ball screw 14c engaged with the nut 2c of the lift shaft 2; and 15, a rotary shaft provided on the side of the base body (hereinafter referred to as "a first rotary shaft 15" when applicable), the rotary shaft being in the form of a cylinder which is inserted into the lift shaft 2 in such a manner that it is rotatably held by the latter. The first horizontal arm 3 which is hollow is secured to the upper end of the first rotary shaft 15, and a driven gear 15b having flange-shaped side plates 15a on its two sides is secured to the lower end of the first rotary shaft 15.

Further in the figures, reference numeral 16 designates a drive unit provided for the first rotary shaft which includes an electric motor 16a and a speed reducer 16b (hereinafter referred to as "a first drive unit 16", when applicable), the first drive unit being mounted on the base body 1; 17, a transmission mechanism which includes a spline transmission shaft 17a made of a bar rectangular in section which is driven by the first drive unit 16; and a driving gear 17b which is slidably mounted on the transmission shaft 17a and which is engaged with the driven gear 15b and is held between the side plates 15a; 18, a transmission shaft provided for the side of work (hereinafter referred to as "a first transmission shaft 18", when applicable), the first transmission shaft 18 including a cylinder which is inserted into the first rotary shaft 15 in such a manner that it is rotatably supported by the latter 15, a driven gear 18b having flange-shaped side plates 18a on its two sides being secured to the lower end of the cylinder; 19, a rotary shaft provided for the side of work (hereinafter referred to as "a second rotary shaft 19", when applicable), the second rotary shaft 19 including a cylinder which is rotatably supported on the outer turning end of the first horizontal arm 3 and has the second horizontal arm 5 which is hollow at the lower end; 20, a belt-laid transmission unit provided for the side of work (hereinafter referred to as "a first belt-laid transmission unit 20", when applicable), the first belt-laid transmission unit 20 comprising a timing belt 20c which is laid over a sprocket 20a secured to the upper end of the first transmission shaft 18 and a sprocket 20b secured to the upper end of the second rotary shaft 19; 21, a drive unit provided for the first transmission shaft (hereinafter referred to as "a second drive unit 21", when applicable), the second drive unit 21 including an electric motor 21a and a speed reducer 21b and being mounted on the base body 1; 22, a transmission mechanism including: a spline transmission shaft 22a made of a bar rectangular in section which is driven by the second drive unit 21, and a driving gear 22b which is slidably mounted on the transmission shaft 22a and which is engaged with the driven gear 18b and is held between the side plates 18a; 23, a transmission shaft provided for the side of the hand (hereinafter referred to as "a second transmission shaft 23" when applicable) which is inserted into the first transmission shaft 18 in such a manner that it is rotatably held by the latter 18, the second transmission shaft 23 having a driven gear 23b at the lower end which has flange-shaped side plates 23a on both sides; and 24, belt-laid transmission unit provided for the side of the hand (hereinafter referred to as "a second belt-laid transmission unit 24", when applicable).

Further in the figures, reference character 24a designates an intermediate transmission shaft of the second belt-laid transmission unit 24 which is inserted into the second rotary shaft 19 in such a manner that it is rotatably supported by the latter 19; 24b, a hand rotating shaft which is rotatably held on the rotary end of the second horizontal arm 5 and has the hand 7 at the lower end; 24c, a timing belt laid over (wound on) a sprocket 24d secured to the upper end of the second transmission shaft 23 and a sprocket 24e secured to the upper end of the intermediate transmission shaft 24a; 24f, a timing belt laid over (wound on) a sprocket 24g secured to the lower end of the intermediate transmission shaft 24a and a sprocket 24h secured to the upper end of the hand rotating shaft 24b; 25, a drive unit provide for the second transmission shaft (hereinafter referred to as "as third drive unit 25", when applicable), the third drive unit 25 including an electric motor 25a and a speed reducer 25b and being mounted on the base body 1; 26, a transmission mechanism including a spline transmission shaft 26a made up of a bar rectangular in section which is driven by the third drive unit 25, and a driving gear 26a which is slidably mounted on the transmission shaft 26a and which is engaged with the driven gear 23b and held between the side plates 23a; and 27, a workpiece held by the hand 7.

In the industrial robot thus constructed, the lift drive unit 14 provided in the base body 1 is operated to drive the lift shaft 2 through the rail 13 until the first horizontal arm 3 is set at a predetermined level. Then the first drive unit 16 provided in the base body 1 is operated to turn the first rotary shaft 15 through the transmission mechanism 17 so that the first horizontal arm 3 is horizontally set at a predetermined position. Under this conditions, the second drive unit 21 provided in the base body 1 is operated to turn the second rotary shaft 19 through the transmission mechanism 22 and the first belt-laid transmission unit 20 so that the second horizontal arm is horizontally set at a predetermined position. Thereafter, the third drive unit 25 provided in the base body 1 is operated to turn the handle rotating shaft 24b with the aid of the transmission mechanism 26 and the second belt-laid transmission unit 24 so that the hand assumes a predetermined posture in a plane.

As is apparent from the above description, the first horizontal arm 3 etc. are driven by the first drive unit 16 etc. provided in the base body 1. Therefore, it is unnecessary to provide drive units at the operating points of each of the horizontal arms etc. with the result that the operating sections can be reduced in weight. Accordingly, the first horizontal arm 3 etc. can be operated readily at higher speed, or at higher acceleration or deceleration speed; that is, it can be operated with short period. Thus, the industrial robot of the invention is high in work efficiency. Furthermore, since the first drive unit 16 etc. are fixedly mounted on the stationary base body 1, the industrial robot of the invention is free form the difficulty that the cables provided therefor are broken being vibrated; that is, the industrial robot of the invention is high in the reliability in operation.

As was described above, in the industrial robot of the invention, the lift shaft is moved vertically by the lift drive unit mounted in the base body, the first horizontal arm is turned through the transmission mechanism and the first rotary shaft by the first drive unit mounted in the base body, the second horizontal arm is turned through the transmission mechanism, the first belt-laid transmission unit and second rotary shaft by the second drive unit provided in the base body, and the hand is turned through the transmission mechanism, second belt-laid transmission unit and hand rotating shaft by the third drive unit mounted in the base body. That is, in the industrial robot of the invention, the operating sections such as the horizontal arms are driven by the drive units mounted on the base body, and therefore they can be reduced in weight as much, and their operations can be achieved readily at higher speed. In other words, the industrial robot of the invention is short in operating period and high in work efficiency. Furthermore, since the drive units are fixedly secured to the stationary base body, the industrial robot is free from the difficulty that the cables connected thereto are broken by being vibrated. Thus, the industrial robot according to the invention is high in the reliability in operation.

What is claimed in:

1. An industrial robot, comprising:
a base body;
a lift shaft provided on said base body;
a first horizontal arm having one end thereof which is provided on said lift shaft;
a second horizontal arm having one end thereof which is rotatably coupled to the other end of said first horizontal arm;
a hand provided on the other end of said second horizontal arm;
a lift drive unit provided on said base body for moving said lift shaft vertically;
first, second and third transmission mechanisms each of which is provided in said base body and including a spline transmission shaft held vertically and a driving gear slidably engaged with said spline transmission shaft;
a first rotary shaft which is rotatably held by and coaxial with said lift shaft, said first rotary shaft having a first driven gear engaged with said driving gear of said first transmission mechanism at a lower end thereof, said first horizontal arm being secured to an upper end of said first rotary shaft;
a second rotary shaft having an upper end thereof which is rotatably supported on the other end of said first horizontal arm, and a lower end thereof to which one end of said second horizontal arm is secured;
a first belt-laid transmission unit for operating said second rotary shaft;
a first transmission shaft having an upper end thereof to which said first belt-laid transmission unit is provided, and a second driven gear at a lower end thereof, said second driven gear being engaged with said gear of said second transmission mechanism, said first transmission shaft being rotatably held by and coaxial with said lift shaft;
an intermediate transmission shaft which is rotatably coaxially supported by said second rotary shaft;
a hand rotating shaft for supporting said hand, which is rotatably supported on the other end of said second horizontal arm;
a second belt-laid transmission unit for operating said hand rotating shaft through said intermediate transmission shaft;
a second transmission shaft which is rotatably coaxially supported in said lift shaft, said second transmission shaft having an upper end thereof to which said second belt-laid transmission unit is provided, said second transmission shaft having a third driven gear at a lower end thereof, which is engaged with said gear of said third transmission mechanism; and
first, second and third drivers mounted on said base body for driving said first, second and third transmission mechanisms, respectively.

2. An industrial robot as claimed in claim 1, wherein said lift shaft, said first rotary shaft and said first transmission shaft are cylindrical, respectively, said second transmission shaft being inserted into said first transmission shaft which is inserted into said first rotary shaft.

3. An industrial robot as claimed in claim 1, wherein said first and second horizontal arms are hollow, in which said first belt-laid transmission unit and a part of said second belt-laid transmission unit are inserted into said first horizontal arm, and the remaining of said second belt-laid transmission unit is inserted into said second horizontal arm.

4. An industrial robot as claimed in claim 1, wherein said first belt-laid transmission unit is constructed by a timing belt wound between said upper end of said first transmission shaft and said upper end of said second rotary shaft.

5. An industrial robot as claimed in claim 4, wherein said second belt-laid transmission unit is constructed by a timing belt wound between said upper end of said second transmission shaft and said upper end of said intermediate transmission shaft and a timing belt wound between said lower end of said intermediate transmission shaft and said upper end of said hand rotating shaft.

* * * * *